US006827332B2

(12) United States Patent
Hanneke et al.

(10) Patent No.: US 6,827,332 B2
(45) Date of Patent: Dec. 7, 2004

(54) SOLENOID VALVE

(75) Inventors: Juergen Hanneke, Stuttgart (DE); Daniel Koehler, Althengstett (DE)

(73) Assignee: Robert Bosch GmbH, Stuttgart (DE)

( * ) Notice: Subject to any disclaimer, the term of this patent is extended or adjusted under 35 U.S.C. 154(b) by 98 days.

(21) Appl. No.: 10/279,046

(22) Filed: Oct. 22, 2002

(65) Prior Publication Data

US 2003/0094516 A1 May 22, 2003

(30) Foreign Application Priority Data

Oct. 23, 2001 (DE) ........................................ 101 52 172

(51) Int. Cl.[7] ................................................ F16K 31/02
(52) U.S. Cl. .............................. 251/129.15; 251/129.01
(58) Field of Search ........................ 251/129.01–129.22

(56) References Cited

U.S. PATENT DOCUMENTS 4,774,976 A * 10/1988 Janecke et al. ............... 137/14
4,800,912 A * 1/1989 Hafner et al. ............ 137/15.19
4,928,785 A * 5/1990 Harrison ..................... 181/120
5,050,642 A * 9/1991 Bright ................... 137/625.65
5,178,150 A * 1/1993 Silverstein et al. ......... 600/463
6,019,120 A * 2/2000 Najmolhoda et al. ......... 137/82
6,305,664 B1 * 10/2001 Holmes et al. ........ 251/129.18
6,601,822 B2 * 8/2003 Tachibana et al. ..... 251/129.15

FOREIGN PATENT DOCUMENTS

DE 196 50 865 6/1998
EP 0 690 223 1/1996

* cited by examiner

*Primary Examiner*—Paul J. Hirsch
(74) *Attorney, Agent, or Firm*—Kenyon & Kenyon

(57) ABSTRACT

A solenoid valve having a magnet assembly and an injector body connected thereto, the magnet assembly and the injector body being joined together using a crimped retaining ring as the connecting element.

13 Claims, 3 Drawing Sheets

SOLENOID VALVE

FIELD OF THE INVENTION

The present invention relates to a solenoid valve.

BACKGROUND INFORMATION

Such a solenoid valve is referred to, for example, in European Published Patent Application No. 0 690 223, in which the solenoid valve is used to control an electrically controlled fuel injector.

Such a solenoid valve is also referred to, for example, in German Published Patent Application No. 196 50 865, in which the solenoid valve has an armature having a multi-part construction. To avoid post-pulse oscillation of an armature plate after the solenoid valve has closed, a damping device is provided on the armature.

In solenoid valves, a magnet assembly, for example, maybe screwed to an injector body or fuel injector housing using a magnet lock nut. The relatively complex and costly mounting required for this screw connection may be disadvantageous. In addition, magnet lock nuts may loosen during operation of the solenoid valve, which may impair the reliability and effectiveness of the solenoid valve. Magnet lock nuts should be manufactured from a relatively hard material, such as steel alloys, for example, ETG 100.

SUMMARY

An object of the present invention is to provide an improved option for connecting the magnet assembly and injector body of a solenoid valve.

Using an exemplary approach according to the present invention, it is believed that an injector body may be mounted on a magnet assembly more simply and less costly, compared with conventional approaches. An installation tool, which is required for this operation, may be easier and more economical to provide, compared to open-end wrenches (controlled via a screw station having a force transducer) customarily used for tightening magnet lock nuts. During installation according to the present invention, the connecting element is uniformly deformed, whereas with tightened magnet lock nuts, an oval or non-uniform deformation has been observed. To achieve the connection according to the present invention, bolts may be used which, in a uniform manner or in segments of equal size, exert pressure circumferentially on the retaining ring used as the connecting element. The described connection according to the present invention may allow the cycle time to be reduced during the manufacture of solenoid valves, so that exemplary solenoid valves according to the present invention may, for example, be suitable for mass production.

The retaining ring may, for example, include two crimped edges that cooperate with the corresponding grooves and/or projections of the injector body or magnet assembly, respectively. The two crimped edges help assure a firm connection between the magnet assembly and the injector body, in a robust and reliable manner.

According to one exemplary solenoid valve of the present invention, the retaining ring is more elastic than the magnet lock nuts. The required elasticity is determined by particular circumstances, and the connecting ring may include, for example, stainless steel alloys, such as 1.4303 or 1.4301 alloys.

The retaining ring may include a lateral recess. Such a recess may, for example, be used as a rupture point or break point, so that the retaining ring may be easily detached, to loosen the connection between the magnet assembly and the injector body. This helps ensure that no contaminations appear when the solenoid valve is disassembled. For example, the formation of particles or shavings, which may appear when loosening conventional magnet lock nuts, may be prevented.

DETAILED DESCRIPTION

Figure 1:
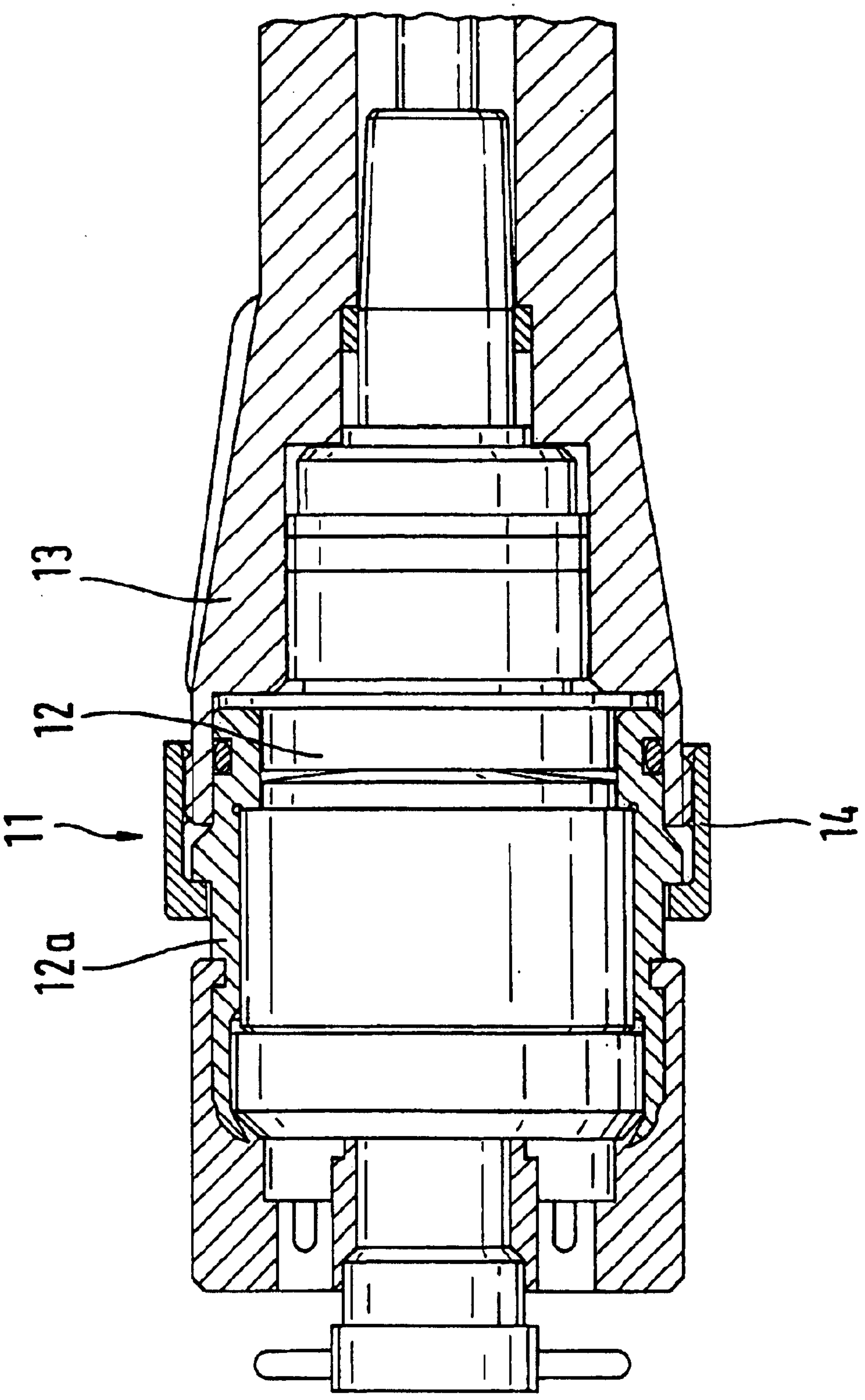
FIG. 1 is a side view of a conventional solenoid valve, in which the magnet assembly and the injector body are joined together by a magnet lock nut.

FIG. 1 shows a conventional solenoid valve 11. Solenoid valve 11 has a magnet assembly 12 enclosed by a sleeve 12*a*. The operating principle of the magnet assembly is not described here in detail. Magnet assembly 12 is connected to an injector body 13 via magnet lock nut 14, which includes a screw station (not shown) on which an open-end wrench may be placed to tighten the magnet lock nut. Magnet lock nut 14 may disadvantageously deform into an oval shape during tightening. Plastic deformation of sleeve 12*a* may also result. In addition, the interaction between the nut and the wrench may produce particle deposits, thereby creating the risk of contamination of the solenoid valve and the assembly lines.

Figure 2:
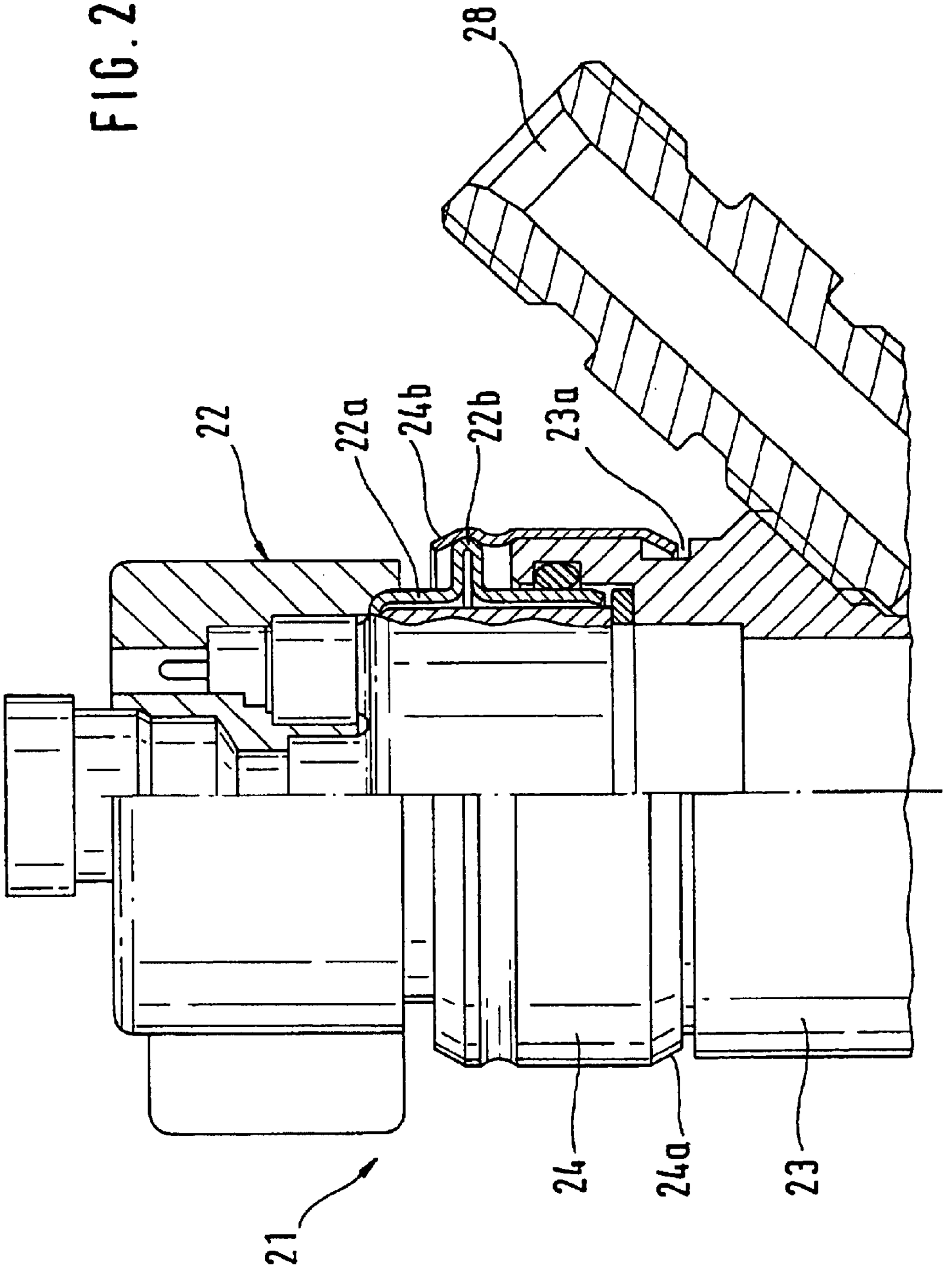
FIG. 2 is a schematic side view of a first exemplary solenoid valve according to the present invention.
Figure 3:
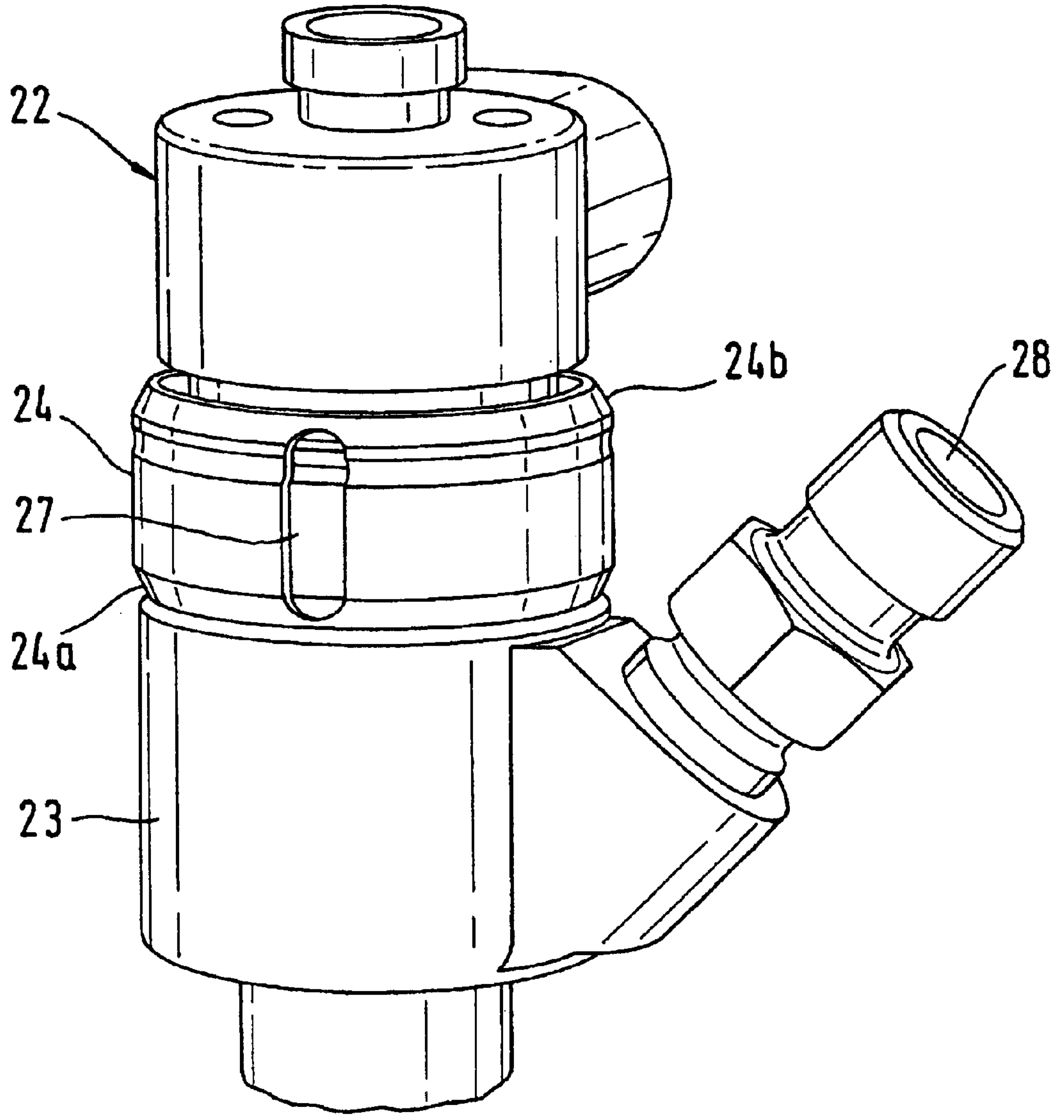
FIG. 3 is a non-cutaway side view of the solenoid valve illustrated in FIG. 2.

An exemplary solenoid valve 21 according to the present invention is illustrated in FIGS. 2 and 3. The solenoid valve 21 includes a magnet assembly 22, an injector body 23, and a connecting part 28 situated on the injector body, for example, to join a pressure borehole in the solenoid valve to a high pressure accumulator.

Magnet assembly 22 and injector body 23 are joined together by a retaining ring 24, which has a first crimped edge 24*a* and a second crimped edge 24*b*. Crimped edge 24*a* cooperates with a lower groove 23*a* in injector body 23, and the retaining ring 24 is crimped into groove 23*a* of injector body 23 to form crimped edge 24*a*.

Second crimped edge 24*b* surrounds a shoulder support 22*b* of a sleeve 22*a* on magnet assembly 22. Sleeve 22*a* may, for example, be a deep-drawn component.

The solenoid valve may be installed, for example, by first placing retaining ring 24 on injector body 23, and then crimping the retaining ring into lower groove 23*a* of injector body 23. Magnet assembly 22 is then mounted or joined to the injector body. For example, magnet assembly 22 is then pressed tightly against injector body 23, using a hold-down, while the second crimping procedure forms second crimped edge 24*b*. It may be advantageous for shoulder support 22*b* to be elastically deformable during the second crimping procedure, thereby simplifying the creation of second crimped edge 24*b*. Plastic deformation of shoulder support 22*b* does not occur.

The retaining ring thus holds the magnet assembly and the injector body together. Crimped edges 24*a* and 24*b* engage in groove 23*a* of injector body 23 and around shoulder support 22*b* of sleeve 22*a*, respectively.

Finally, FIG. 3 illustrates a non-cutaway side view of the solenoid valve illustrated in FIG. 2. The components already described with reference to FIG. 2 are provided here with the same reference numbers. In this illustration, a recess 27 is provided on the outside of retaining ring 24, which may be detached by breaking at the lateral recess 27.

What is claimed is:

1. A solenoid valve, comprising:

a magnet assembly;

a crimped retaining ring; and an injector body connected to the magnet assembly via the crimped retaining ring;

wherein the retaining ring includes at least one crimped edge cooperating with a corresponding groove of one of the injector body and the magnet assembly.

2. The solenoid valve according to claim 1, wherein the retaining ring includes a first crimped edge cooperating with the corresponding groove of the one of the injector body and the magnet assembly, and a second crimped edge cooperating with one of a corresponding groove and a corresponding projection of the other of the injector body and the magnet assembly.

3. The solenoid valve according to claim 1, wherein the retaining ring includes an elastic material.

4. The solenoid valve according to claim 3, wherein the elastic material includes a stainless steel alloy.

5. The solenoid valve according to claim 1, wherein the retaining ring includes a lateral recess.

6. The solenoid valve according to claim 5, wherein the recess has an oblong shape.

7. The solenoid valve according to claim 5, wherein the lateral recess forms an exposed bore through the retaining ring.

8. The solenoid valve according to claim 1, wherein the retaining ring includes a lateral recess with breakable edges, the retaining ring detachable from the solenoid valve by the breakable edges.

9. The solenoid valve according to claim 2, wherein the magnet assembly includes a sleeve, and the projection corresponds a shoulder support of the sleeve.

10. The solenoid valve according to claim 9, wherein the shoulder support is elastically deformable.

11. The solenoid valve according to claim 9, wherein the retaining ring includes an indented portion that dips into a space between the injector body and the shoulder support.

12. The solenoid valve according to claim 2, wherein the first crimped edge and the second crimped edge are arranged in a region connecting the magnet assembly and the injector body.

13. The solenoid valve according to claim 12, wherein the injector body extends beyond the first crimped edge, and the magnet assembly extends beyond the second crimped edge.

* * * * *